United States Patent [19]
Monzaki et al.

[11] Patent Number: 5,236,257
[45] Date of Patent: Aug. 17, 1993

[54] BRAKE PRESSURE GENERATOR HAVING MEANS FOR CONTROLLING PRESSURE INDEPENDENT OF OPERATION OF BRAKE OPERATING MEMBER

[75] Inventors: Shirou Monzaki, Susono; Harumi Ohori, Toyota; Hideyuki Aizawa, Susono; Ryozo Saitoh, Okazaki; Yutaka Ohnuma, Numazu, all of Japan

[73] Assignee: Toyota Jidosha Kabushiki Kaisha, Aichi, Japan

[21] Appl. No.: 669,060

[22] Filed: Mar. 14, 1991

[30] Foreign Application Priority Data

Mar. 20, 1990 [JP] Japan .................................. 2-71568
Jul. 11, 1990 [JP] Japan .................................. 2-183598
Oct. 29, 1990 [JP] Japan .................................. 2-291292

[51] Int. Cl.$^5$ .............................................. B60T 8/44
[52] U.S. Cl. .............................. 303/114.1; 303/114.2; 303/115.2
[58] Field of Search ...... 303/113 TR, 113 R, 115 PP, 303/113 TB, 114 R, 114 PN, 115 EE

[56] References Cited

U.S. PATENT DOCUMENTS

| | | | |
|---|---|---|---|
| 4,653,815 | 3/1987 | Agarwal et al. | 303/115 EC |
| 4,678,242 | 7/1987 | Belart | 303/114 R |
| 4,678,243 | 7/1987 | Belart | 303/114 R |
| 4,838,619 | 6/1989 | Ocvirk | 303/114 PN |
| 4,861,117 | 8/1989 | Reinartz et al. | 303/113 TB |
| 4,917,445 | 4/1990 | Leppek et al. | 303/115 EC |
| 5,011,237 | 4/1991 | Matouka et al. | 303/115.2 |

FOREIGN PATENT DOCUMENTS

| | | |
|---|---|---|
| 0292648 | 11/1988 | European Pat. Off. |
| 0298617 | 1/1989 | European Pat. Off. |
| 0317303 | 5/1989 | European Pat. Off. |
| 0398532 | 11/1990 | European Pat. Off. |
| 0411320 | 2/1991 | European Pat. Off. |
| 2565185 | 12/1985 | France |
| 2578500 | 9/1986 | France |
| 60-85052 | 5/1985 | Japan |

*Primary Examiner*—Matthew C. Graham
*Attorney, Agent, or Firm*—Oliff & Berridge

[57] ABSTRACT

A pressure generating apparatus for a hydraulic brake system, including a master cylinder having a pressure piston which partially defines a pressure chamber and which is advanced to generate a fluid pressure in the pressure chamber in response to an operation of a brake operating member. The apparatus further includes inhibiting device having a non-operated state for allowing the pressure piston to be advanced, and an operated state for inhibiting the pressure piston from being advanced, and a pressure changing device having a pressure changing chamber communicating with the pressure chamber. The pressure changing device operates to change a volume of the pressure changing chamber and thereby change the pressure chamber pressure. A controller is provided for controlling the inhibiting device and the pressure changing device, to change the pressure in the pressure chamber while the inhibiting device is placed in the operated state.

19 Claims, 5 Drawing Sheets

ANTILOCK CONTROL UNIT

BRAKE PRESSURE GENERATOR HAVING MEANS FOR CONTROLLING PRESSURE INDEPENDENT OF OPERATION OF BRAKE OPERATING MEMBER

BACKGROUND OF THE INVENTION

1. Field of the Invention

The present invention relates generally to a brake pressure generating apparatus, and more particularly to a technique for simplifying the overall construction of such a brake pressure generating apparatus.

2. Discussion of the Prior Art

A hydraulically operated brake system is known, wherein a brake is applied based on a fluid pressure. A pressure generator used in such a hydraulic operated brake system generally includes a brake operating member, and a master cylinder having a pressure piston which partially defines a pressure chamber and which is advanced in response to an operation of the brake operating member, to generate a fluid pressure in the pressure chamber. The brake system of the type equipped with such a pressure generator is sometimes required to control the braking fluid pressure independently of the operating amount or force of the brake operating member. For example, an anti-lock brake system for a motor vehicle must be adapted to satisfy this requirement.

The anti-lock brake system is capable of applying a brake to a vehicle wheel so as to maintain the slip ratio of the wheel within an optimum range, by lowering the fluid pressure in a brake cylinder for the wheel, when the slip ratio of the wheel exceeds an upper limit of the optimum range due to an excessive rise of the wheel cylinder pressure. A so-called "recirculating type" of anti-lock brake system is known as disclosed in laid-open Publication No. 60-85052 of unexamined Japanese Patent Application. This recirculating type anti-lock brake system uses a solenoid-operated directional control valve disposed between the master cylinder, and the wheel cylinder and a reservoir. The directional control valve has a pressure-increase position for fluid communication between the master cylinder and the wheel cylinder, a pressure-decrease position for fluid communication between the wheel cylinder and the reservoir, and a pressure-hold position in which the wheel cylinder is disconnected by the valve from the master cylinder and the reservoir. The anti-lock brake system further includes a pump for returning the brake fluid from the reservoir back to the master cylinder. In operation, the directional control valve is selectively placed in one of the three positions, for increasing, decreasing and holding the fluid pressure in the wheel cylinder, so that the slip ratio of the vehicle wheel is held within the optimum range. The fluid discharged from the wheel cylinder to the reservoir is returned by the pump to the master cylinder.

However, the recirculating type anti-lock brake system tends to be complicated in overall construction due to the use of the reservoir and the solenoid-operated directional control valve, and the requirement for the pump for returning the brake fluid from the reservoir back to the master cylinder. Namely, the anti-lock brake system tends to have a relatively large number of components, leading to an accordingly high cost of manufacture. This problem is also encountered on a hydraulically operated brake system equipped with a traction control device adapted to prevent slipping of the vehicle wheel upon starting or rapid acceleration of the vehicle.

SUMMARY OF THE INVENTION

It is therefore a first object of the present invention to provide a pressure generating apparatus for a hydraulically operated brake system, which is capable of generating a fluid pressure independently of the operating amount or force of the brake operating member and which is simple in construction.

A second object of the invention is to provide such a pressure generating apparatus which assures regulation of the fluid pressure so as to change with the operating amount or force of the brake operating member.

A third object of the invention is to provide such a pressure generating apparatus whose axial or longitudinal dimension is considerably shortened.

The first object may be achieved according to the principle of the present invention, which provides a pressure generating apparatus for a hydraulically operated brake system, comprising: (a) a master cylinder having a pressure piston which partially defines a pressure chamber and which is advanced to generate a fluid pressure in the pressure chamber in response to an operation of a brake operating member; (b) an inhibiting device having a non-operated state for allowing the pressure piston to be advanced, and an operated state for inhibiting the pressure piston from being advanced; (c) a pressure changing device having a pressure changing chamber communicating with the pressure chamber, and operable to change a volume of the pressure changing chamber and thereby change the pressure in the pressure chamber; and (d) a controller for controlling the inhibiting device and the pressure changing device, to change the pressure in the pressure chamber while the inhibiting device is placed in the operated position.

In the pressure generating apparatus of the present invention constructed as described above, the inhibiting device is normally placed in the non-operated state to permit the pressure piston to be advanced upon operation of the brake operating member, so that the fluid pressure in the pressure chamber changes with the operating amount or force of the brake operating member. Namely, the fluid pressure in the pressure chamber rises to a level corresponding to the operating force acting on the brake operating member, as the pressure piston is advanced with the operation of the brake operating member.

When it becomes necessary to control the fluid pressure independently of the operating force of the brake operating member, the controller commands the inhibiting device to be placed in the operated state, and controls the pressure changing device to change the volume of the pressure changing chamber and thereby change the pressure in the pressure chamber. More specifically, when the fluid pressure in the pressure chamber is lowered with an increase in the volume of the pressure changing chamber, the pressure piston is prevented by the inhibiting device from being advanced. In other words, while the pressure changing device is operated to lower the fluid pressure in the pressure chamber, the pressure piston is not advanced by the brake operating member, whereby the fluid pressure in the pressure chamber is not increased by the operation of the brake operating member. When the volume of the pressure changing chamber is reduced by the pressure changing device, the fluid pressure in the pressure chamber is increased. Thus, the pressure developed by the master cylinder can be controlled, by changing the volume of the pressure changing chamber to change the pressure in the pressure chamber independently of the operation of the brake operating member.

Thus, the pressure generating apparatus of the present invention is capable of controlling the fluid pressure in the master cylinder independently of the operating force applied to the brake operating member, such that the volume of the pressure changing chamber of the pressure changing device is increased or reduced irrespective of the operation of the brake operating member. Where the brake system is used for applying brake to a vehicle wheel, the brake fluid pressurized by the pressure chamber of the master cylinder is fed to the wheel cylinder to increase the braking pressure in the wheel cylinder, while the brake fluid is discharged from the wheel cylinder back to the pressure chamber to lower the braking pressure in the wheel cylinder. That is, the master cylinder which normally generates the fluid pressure corresponding to the operating force of the brake operating member, cooperates with the inhibiting device and the pressure changing device, when needed, to control the braking pressure in the wheel cylinder, irrespective of the operating force of the brake operating member. Accordingly, the present apparatus does not require a reservoir, a solenoid-operated directional control valve and a pump which are conventionally used, and is accordingly simplified in construction as a whole, being available at a considerably reduced cost.

In one form of the present invention, the inhibiting device comprises a movable member which is interposed between the brake operating member and the pressure piston, and which is advanced in response to the operation of the brake operating member, and inhibiting means for allowing advancing and retracting movements of the movable member when the inhibiting device is in a non-operated state. The inhibiting means inhibits at least the advancing movement of the movable member when the inhibiting device is in an operated state. In this case, the movable member may be a control piston which is fluid-tightly and axially slidably disposed in the housing of the apparatus. The control piston partially defines a control chamber filled with a fluid, such that a volume of the control chamber is reduced by the advancing movement of the control piston. The inhibiting means may comprise a shut-off valve provided in a fluid passage communicating with a reservoir and the control chamber.

The second object indicated above may be achieved according to a preferred arrangement of the above form of the invention, in which the apparatus further comprises a fail-safe device for inhibiting the advancing movement of the movable member under normal conditions when the inhibiting device is placed in the operated state, and for allowing the advancing movement of the movable member under abnormal conditions when the inhibiting device is abnormally placed in the operated state. The phrase "abnormally placed in the operated state" in connection with the inhibiting device should be interpreted to cover the following abnormal conditions of the apparatus, for example: (a) the normally functioning inhibiting device is unnecessarily placed in the operated state due to a failure or trouble with the controller; (b) the inhibiting means is defective and cannot be placed in the non-operated state to permit the advancing and retracting movements of the movable member, even when the normally functioning controller commands the inhibiting device to be placed in the non-operated state; and (c) both the inhibiting device and the controller are defective.

In the preferred arrangement described above, the fail-safe device prevents the advancing movement of the movable member under normal conditions while the inhibiting device is normally placed in the operated state. In this condition, the volume of the pressure changing chamber is changed by the pressure changing device, so that the pressure in the pressure chamber of the master cylinder is changed, irrespective of the operation of the brake operating member. In the event of any trouble with the controller or inhibiting device, resulting in the inhibiting device abnormally being placed in the operated state, the fail-safe device operates to allow the movable member to be advanced, thereby permitting the fluid pressure to be developed in the pressure chamber depending upon the operation of the brake operating member.

Thus, the master cylinder may generate the fluid pressure according to the operation of the brake operating member, to maintain a braking force corresponding to the operating force acting on the brake operating member, in the event the inhibiting device is abnormally placed in the operated position. In the absence of the fail-safe device, an state of the brake operating member would not cause the master cylinder to generate a fluid pressure, since the movable member is undesirably locked by the inhibiting device abnormally placed in the operated position. According to the present arrangement, the fail-safe device permits the movable member to be advanced in such defective or abnormal condition of the apparatus, so that a necessary braking force is provided by the fluid pressure developed in the pressure chamber based on the operation of the brake operating member.

According to another preferred form of the invention, the pressure changing device comprises: a screw device including an externally threaded member and an internally threaded member which engage each other, one of the externally and internally threaded members being a rotatably immovable threaded member prevented from rotating about an axis thereof; a drive device for rotating the other of the externally and internally threaded members being a rotatably movable threaded member; and a pressure changing piston axially movable with one of the externally and internally threaded members, for changing the volume of the pressure changing chamber.

The third object indicated above may be accomplished according to one arrangement of the above form of the invention, wherein the pressure changing device and the master cylinder are structurally separated from each other, except that the pressure changing chamber of the pressure changing device and the pressure chamber of the master cylinder communicate with each other through a fluid passage. In this case, the inhibiting device may be disposed coaxially or concentric with the master cylinder, and the pressure changing device may be disposed such that the axes of the pressure changing device and the inhibiting device are spaced from each other.

In the above arrangement, the pressure changing chamber is connected to the pressure chamber of the master cylinder by a conduit to change the pressure in the pressure chamber by changing the volume of the pressure changing chamber. Therefore, this arrangement does not require the pressure changing device and the master cylinder to be disposed in series connection or coaxial relation with each other. Consequently, the axial length of the pressure generating apparatus is determined by the total length of a hydraulic unit which includes the master cylinder the inhibiting device (and a booster, when needed). This axial length of the pressure generating apparatus is considerably shorter than that of the arrangement wherein the pressure changing device as well as the inhibiting device is disposed coaxially with the master cylinder. Where the pressure generating apparatus is used for a brake system of a motor vehicle, the master cylinder, inhibiting device and pressure changing device are coaxially incorporated in a hydraulic unit accommodated in an engine room of the vehicle. In this respect, it is noted that the master cylinder must be positioned parallel to the running direction of the vehicle and have a horizontal attitude. Accordingly, a space having a considerably large length in the vehicle running direction must be provided in the engine room, for accommodating the hydraulic unit, if the master cylinder, inhibiting device and pressure changing device are all disposed coaxially with each other. According to the above arrangement, however, the pressure changing device may be easily juxtaposed relative to or located parallel to the relatively short hydraulic unit including the master cylinder and the inhibiting device.

BRIEF DESCRIPTION OF THE DRAWINGS

The above and optional objects, features and advantages of the present invention will become more apparent by reading the following detailed description of presently preferred embodiments of the invention, when considered in conjunction with the accompanying drawings, in which.

DETAILED DESCRIPTION OF THE PREFERRED EMBODIMENTS

The preferred embodiments of the present invention as applied to a pressure generating apparatus for a hydraulically operated anti-lock brake system for a motor vehicle will be described by reference to the accompanying drawings.

Figure 1:
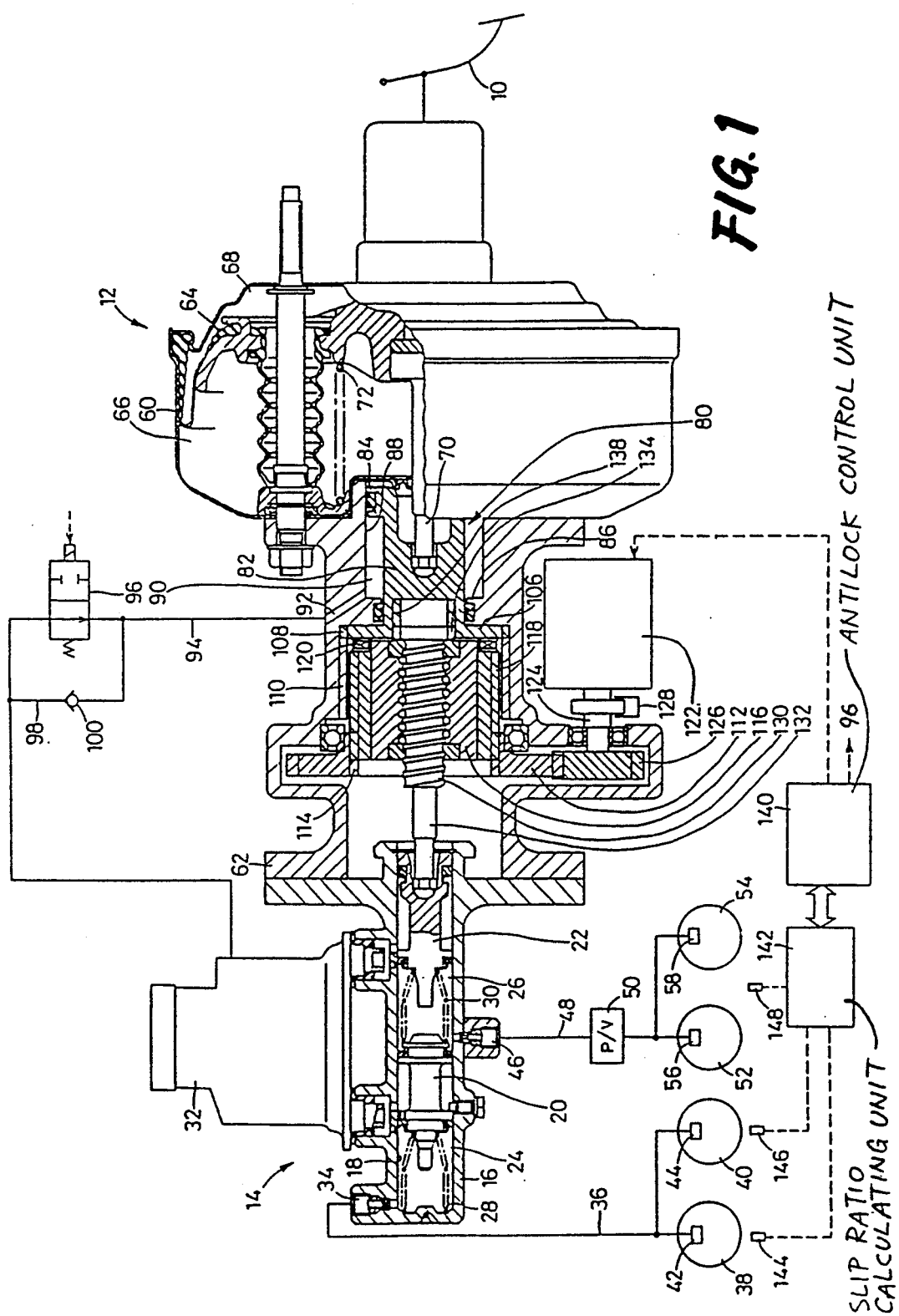
FIG. 1 is a partially diagrammatic front elevational view in cross section, showing an anti-lock hydraulic brake system incorporating a pressure generating apparatus constructed according to one embodiment of the present invention.

Referring first to FIG. 1, reference numeral 10 denotes a brake operating member in the form of a brake pedal. An operating force acting on the brake pedal 10 is boosted by a vacuum booster 12, to operate a master cylinder 14 to generate a fluid pressure therein. The master cylinder 14 has a cylinder bore 18 formed in a housing 16. Within the cylinder bore 18, there are fluid-tightly and axially slidably received a first pressure piston 20 and a second pressure piston 22. These pressure pistons 20, 22 partially define respective first and second pressure chambers 24, 26, such that the pressure chambers 24, 26 are located in front of the pistons 20, 22. A first and a second return spring 28, 30 are disposed within the first and second pressure chambers 24, 26, respectively. When the brake pedal 10 is operated or depressed, the first and second pressure pistons 20, 22 are advanced against the biasing actions of the respective return springs 28, 30, whereby the first and second pressure chambers 24, 26 are disconnected from a reservoir 32, and then the fluid pressures in the chambers 24, 26 are increased.

The fluid pressure generated in the first pressure chamber 24 is applied to front wheel cylinders 42, 44 for a front left wheel 38 and a front right wheel 40 of the vehicle, via a port 34 and a fluid passage 36. On the other hand, the fluid pressure generated in the second pressure chamber 26 is applied to rear wheel cylinders 56, 58 for a rear left wheel 52 and a rear right wheel 54 of the vehicle, via a port 46, a fluid passage 48 and a proportioning valve 50. The anti-lock brake system shown in FIG. 1 has two pressure application arrangements, one for the front wheel cylinders 42, 44, and the other for the rear wheel cylinders 56, 58.

The vacuum booster 12 has a casing 60 fixed to a housing 62 which is attached to the housing 16 of the master cylinder 14. The casing 60 accommodates a diaphragm type power piston 64. On one of axially opposite sides of the power piston 64, there is formed a constant-pressure chamber 66 communicating with a vacuum source such as an intake manifold of an engine of the vehicle or a vacuum pump. On the other side of the power piston 64, there is formed a variable-pressure chamber 68 connected to a control valve for selective communication with the constant-pressure chamber 66 or the atmosphere. With a switching operation of the control valve, the pressure in the variable-pressure chamber 68 is changed. The vacuum booster 12 includes an output rod 70 fixed to the power piston 64 such that the output rod 70 extends from the radially central portion of the power piston into the constant-pressure chamber 66. The output rod 70 is biased by a return spring 72 toward the variable-pressure chamber 68. When the brake pedal 10 is in the non-operated position, the variable-pressure chamber 68 is held in communication with the constant-pressure chamber 66, and the power piston 64 is held in its original position, in abutting contact with the inner surface of the casing 60 under the biasing force of the return spring 72. When the brake pedal 10 is depressed, the input rod connected to the pedal 10 is advanced to thereby operate the control valve for disconnecting the variable-pressure chamber 68 from the constant-pressure chamber 66 and communicating the variable-pressure chamber 68 with the atmosphere. When a difference between the pressures in the constant- and variable-pressure chambers 66, 68 exceeds a predetermined value, the power piston 64 is advanced against the biasing force of the return spring 72, whereby an operating force exerted on the brake pedal 10 is boosted, and the boosted output is delivered from the output rod 70 and is transmitted to the first and second pressure pistons 20, 22.

The output rod 70 engages a control piston 80 such that the output rod 70 and the control piston 80 are axially slidable relative to each other. The control piston 80 is fluid-tightly and axially slidably received within the housing 62. When the brake pedal 10 is depressed, the control piston 80 is advanced together with the output rod 70. The control piston 80 has a small-diameter portion 82, and a large-diameter portion of 84 in the form of an outward flange formed at the rear end of the small-diameter portion 84. The small-diameter portion 82 fluid-tightly and axially slidably engages an inward flange 86 extending inwards from the housing 62, while the outward flange 84 fluid-tightly and axially slidably engage an intermediate-diameter hole 88 formed in the housing 62. Thus, the housing 62 and the control piston 80 cooperate with each other to define an annular control chamber 90 between the outward and inward flanges 84, 86. This fluid chamber 90 is filled with a brake fluid and is connected to the reservoir 32 through a port 92 and a fluid passage 94.

A solenoid-operated shut-off valve 96 is provided in the fluid passage 94, and a by-pass passage 98 is connected to the fluid passage 94 so as to by-pass the shut-off valve 96. The by-pass passage 98 has a check valve 100 which permits a flow of the brake fluid from the reservoir 32 to the annular control chamber 90, but inhibits a flow of the fluid from the control chamber 90 to the reservoir 32. When the solenoid-operated shut-off valve 96 is placed in the closed position, the brake fluid is trapped in the control chamber 90, thereby preventing the control piston 80 from being advanced by the operated brake pedal 10. This prevents an increase in the fluid pressure in the pressure chambers 24, 26 even if the brake pedal 10 is operated. When the operated brake pedal 10 is moved to its non-operated position with the shut-off valve 96 placed in the closed position, the brake fluid is fed from the reservoir 32 into the control chamber 90, whereby the control piston 80 is retracted as the pedal 10 is released. In the present embodiment, the control piston 80 functions as a movable member, and the control chamber 90 and the shut-off valve 96 cooperate to provide means for inhibiting the advancing movement of the movable member 80, as described below in greater detail.

A large-diameter flange 106 extends radially outwardly from the front end of the control piston 80 which is located in front of the inward flange 86 of the housing 62. The large-diameter flange 106 has a spline 108 formed on its outer circumferential surface. The spline 108 engages a splined hole 110 formed in the housing 62, so that the control piston 80 is not rotatable relative to the housing 62.

The housing 62 also accommodates a large-diameter gear 112 such that the gear 112 is rotatably supported by the housing 62. This large-diameter gear 112 has a splined central bore 114 which engages a splined member 118 fixedly mounted on an internally threaded member in the form of a nut 116. A thrust bearing 120 is disposed between the splined member 118 and the control piston 80. The large-diameter gear 112 meshes with a driven gear 126 fixed to a driving member in the form of an output shaft 124 of a drive motor 122, so that the nut 116 is rotated by the drive motor 122 via the driving gear 126, large-diameter gear 112 and splined member 118. The output shaft 124 is provided with a clutch 128 which operates to transmit a torque from the motor 122 (output shaft 124) to the driven gear 126 and prevent the transmission of a torque from the driven gear 126 to the motor 122. The clutch 128 does not permit the nut 116 to rotate when the drive motor 122 is off.

The nut 116 engages an externally threaded member in the form of a ballscrew 130, and cooperates with this ballscrew 130 to provide a screw device. The ballscrew 130 has a push rod 132 extending from the front end of the threaded portion toward the second pressure piston 22 of the master cylinder 14, and a spline 134 formed at the rear end. The spline 134 engages a splined hole 138 formed in the front end portion of the control piston 80, so that the ballscrew 130 and the control piston 80 are not rotatable relative to each other. Namely, the ballscrew 130 is not rotatable relative to the housing 62. The second pressure piston 22 is retracted following a retracting movement of the push rod 132, since the piston 22 is biased by the return spring 30 or the pressure in the second pressure chamber 26. Consequently, the nut 116 and the ballscrew 130 receive from the second pressure piston 22 a force acting in the rear direction toward the control piston 80, whereby the nut 116 is held in abutting contact with the control piston 80. When the output rod 70 and the control piston 80 are advanced upon operation of the brake pedal 10, the first and second pressure pistons 20, 22 are advanced by the control piston 80 through the splined member 118, nut 116 and ballscrew 130. While the control piston 80 is stationary, the nut 116 is not axially moved. Since the ballscrew 130 is splined with the control piston 80 and is prevented from rotating, a rotation of the nut 116 causes the ballscrew 130 to move in the axial direction, resulting in axial movements of the first and second pressure pistons 20, 22 relative to the control piston 80, whereby the volumes of the first and second pressure chambers 24, 26 are changed. More specifically, the volumes of the pressure chambers 24, 26 are reduced to thereby increase the fluid pressures therein, when the pressure pistons 20, 22 are advanced by the push rod 132 of the advancing ballscrew. When the pressure pistons 20, 22 are retracted following a retracting movement of the ballscrew 130, the volumes of the pressure chambers 24, 26 are increased to thereby lower the fluid pressures therein.

In the present embodiment, the large-diameter gear 112, nut 116 (internally threaded member), drive motor 122, driven gear 126 and ball screw 130 with the push rod 132 constitute a major portion of a pressure changing device for changing the volumes of the first and second pressure chambers 24, 26 to thereby change the pressures in these chambers. It will be appreciated that one of the pressure chambers 24, 26 may be considered as a pressure changing chamber whose volume is changed to change the pressure in the other of the pressure chambers 24, 26.

The solenoid-operated shut-off valve 96 and the drive motor 122 are controlled by a controller in the form of an anti-lock control unit 140, which is principally constituted by a microcomputer incorporating a central processing unit (CPU), read-only memory (ROM), a random-access memory (RAM) and a bus interconnecting the CPU, ROM and RAM. A slip ratio calculating unit 142 is connected to the anti-lock control unit 140. The calculating unit 142 receives output signals of front wheel speed sensors 144, 146 for detecting the speeds of the front wheels 38, 40, and an output signal of a rear wheel average speed sensor 148 for detecting an average speed of the rear wheels 52, 54. Based on these output signals of the speed sensors 144, 146, 148, the calculating unit 142 calculates the speeds of the wheels, the running speed of the vehicle, the slip ratios of the wheels, and other variables or parameters used to control the anti-lock brake system. The outputs of the calculating unit 142 are applied to the anti-lock control unit 140.

In the hydraulically operated anti-lock brake system constructed as described above, the solenoid-operated shut-off valve 96 is normally held in the open position for fluid communication between the control chamber 90 and the reservoir 32, so that the control piston 80 is advanced by the operated brake pedal 10, to advance the first and second pressure pistons 20, 22 to generate the fluid pressures in the first and second pressure chambers 24, 26, whereby the wheels 38, 40, 52, 54 are braked by the wheels cylinders 42, 44, 56, 58 activated by the generated fluid pressures applied thereto through the fluid passages 36, 48. At this time, the nut 116 receives from the control piston 80 a force acting in the advancing direction, while the ballscrew 130 receives from the second pressure piston 22 a force acting in the retracting direction. Consequently, the nut 116 and the ballscrew 130 are subject to torques in the opposite directions. However, the rotation of the nut 116 is prevented by the clutch 128 disposed on the output shaft 124 of the drive motor 122, and the rotation of the ballscrew 130 is prevented by the spline engagement with the control piston 80. Therefore, the position of the ballscrew 130 relative to the nut 116 is held unchanged, whereby the operating force which acts on the brake pedal 10 and which is boosted by the booster 12 is transmitted to the pressure pistons 20, 22.

When the slip ratio of any wheel 38, 40, 52, 54 exceeds an upper limit of a predetermined optimum range due to an excessive operating force acting on the brake pedal 10, this fact is detected by the anti-lock control unit 140 based on the output of the slip ratio calculating unit 140. In this event, the control unit 140 commands the shut-off valve 96 to be placed in the closed position to inhibit the advancing movement of the control piston 80, and activates the drive motor 122 for controlling the positions of the first and second pressure pistons 20, 22, so as to control the braking pressures applied to the four wheels 38, 40, 52, 54 in an anti-lock manner.

Described more particularly, the drive motor 122 is first operated in the counterclockwise direction as seen in the advancing direction of the control piston 80 (as seen facing the rear end of the motor 122 or as seen from right to left in FIG. 1). As a result, the nut 116 is rotated in the clockwise direction as seen in the same direction, via the driven gear 126 and the large-diameter gear 112, whereby the ballscrew 130 is retracted so as to increase the volumes of the first and second pressure chambers 24, 26, to lower the fluid pressures in these chambers. With the fluid pressures thus lowered, a reaction force applied from the second pressure piston 22 to the control piston 80 via the ballscrew 130 and nut 116 is reduced. Therefore, as long as the operating force acting on the brake pedal 10 is held constant, the force acting on the control piston 80 in the advancing direction is larger than the force acting in the retracting direction. However, the advancing movement of the control piston 80 is prevented since the shut-off valve 96 is closed to inhibit the fluid from flowing out of the annular control chamber 90. As a result, the pressure in the control chamber 90 rises by an amount corresponding to the amount of reduction of the reaction force of the second pressure piston 22 which acts on the control piston 80. Thus, the advancing movement of the control piston 80 during operation of the drive motor 122 is prevented by the shut-off valve 96 placed in the closed position. Accordingly, the operated brake pedal 10 will not cause the control piston 80 to advance the pressure pistons 20, 22 and increase the pressures in the pressure chambers 24, 26 even when the pressures in these chambers are lowered by the retracting movement of the ballscrew 130 by the motor 122. Eventually, the fluid pressures in the pressure chambers 24, 26 and the pressures in the respective wheel cylinders are lowered to the levels corresponding to the positions of the pressure pistons 20, 22.

When the slip ratio of the relevant wheel has been reduced to fall within the optimum range as a result of the reduction in the fluid pressures in the pressure chambers 24, 26, the drive motor 122 is controlled so that the pressure pistons 20, 22 are stopped or advanced by a suitable distance, for maintaining or decreasing the volumes of the pressure chambers 24, 26, so as to hold or increase the pressures in the pressure chambers 24, 26 and the wheel cylinders 42, 44, 56, 58. When the fluid pressures in the chambers 24, 26 are increased, the reaction force acting on the control piston 80 is accordingly increased, but the forces acting on the control piston 80 in the opposite directions are balanced due to reduction in the control chamber 90 by an amount corresponding to the amount of increase of the reaction force. As a result, the control piston 80 is kept at the same axial position.

As described above, the anti-lock control unit 140 controls the drive motor 122 so as to control the volumes of the first and second pressure chambers 24, 26 and the pressures in the wheel cylinders, irrespective of the operating force currently applied to the brake pedal 10, for maintaining the slip ratios of the wheels within the optimum range. When the brake pedal 10 is operated toward the fully released or non-operated position during this anti-lock regulation of the wheel cylinder pressures, the control piston 80 is retracted, and the nut 116 is retracted together with the ballscrew 130, whereby the fluid pressures in the pressure chambers 24, 26 are lowered to the levels as desired by the vehicle operator.

It will be understood from the foregoing description of the present embodiment that the anti-lock brake system is adapted to perform an anti-lock pressure regulating operation by changing the fluid pressures in the pressure chambers 24, 26 of the master cylinder 14 using the drive motor 122. Hence, the instant anti-lock brake system does not require a solenoid-operated directional control valve and a pump as conventionally used and is available at a reduced cost.

It is also noted that the advancing movement of the control piston 80 is prevented during an anti-lock pressure regulating operation of the wheel cylinders, so that the movements of the pressure pistons 20, 22 during the anti-lock operation will not cause movements of the brake pedal 10. Namely, the brake pedal 10 is free from an otherwise occurring kick-back phenomenon due to the varying pressures in the pressure chambers 24, 26.

In the present brake system, the fluid pressures in the pressure chambers 24, 26 are slowly changed by the movements of the ballscrew 130 with a reduced operating noise during the anti-lock pressure regulating operation, as compared with the noise in the conventional anti-lock brake system in which the fluid pressures are rapidly changed by switching of a solenoid-operated directional control valve for changing the directions of flows of the brake fluid into and out of the wheel cylinders.

In the event of a failure of the drive motor 122 during an anti-lock pressure regulating operation to lower the wheel cylinder pressures, the distance between the front end of the control piston 80 and the front end of the push rod 132 is shortened by an amount corresponding to the distance of the rearward movement of the ballscrew 130 relative to the nut 116 which has occurred to lower the fluid pressures. Accordingly, the required operating stroke of the brake pedal 10 for normally applying brake to the wheels is increased, but the brake can be applied to the wheels by the brake pedal 10 depressed by the vehicle operator.

If the clutch 128 fails to normally function, the nut 116 is permitted to rotate upon advancing movement of the control piston 80 during normal brake application, the ballscrew 130 will be retracted until the rear end of the ballscrew 130 abuts on the control piston 80, whereby the distance between the front ends of the control piston 80 and the push rod 132 is accordingly shortened. As a result, the operating stroke of the brake pedal 10 for providing a given braking effect is increased. However, the braking pressure can be increased by the brake pedal 10 operated by the vehicle operator.

Figure 2:
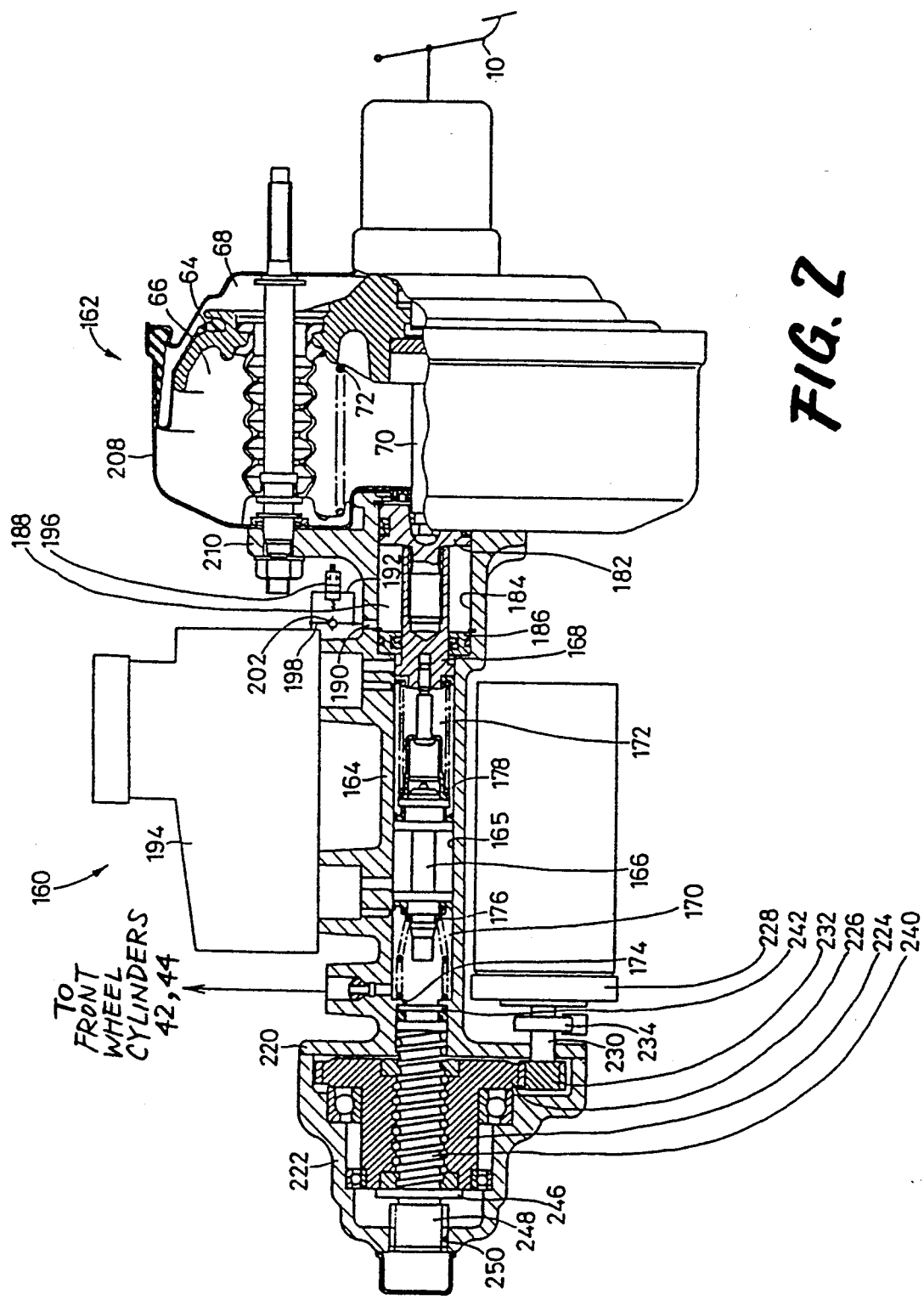
FIG. 2 is a front elevational view in cross section of another embodiment of the pressure generating apparatus of this invention.

Referring next to FIG. 2, there will be described a second embodiment of the present invention. In this second embodiment, the pressure changing device is located on the side of a master cylinder 160 remote from a vacuum booster 162. The master cylinder has a housing 164 in which is formed a cylinder bore 165. A first and a second pressure piston 166, 168 are fluid-tightly and axially slidably received in the cylinder bore 165. The housing 164 is formed with an inward flange portion 174 extending from the inner surface of the cylinder bore 165. Between the inward flange portion 174 and the first pressure piston 166, there is disposed a return spring 176, which biases the piston 166 in the direction to increase the volume of a first pressure chamber 170. A return spring 178 is disposed between the first and second pressure pistons 166, 168, so as to bias the second pressure piston 168 in the direction to increase the volume of a second pressure chamber 172. Fluid pressures are generated in the first and second pressure chambers 170, 172 and are applied to the front and rear wheel cylinders 42, 44, 56, 58, when the first and second pressure pistons 166, 168 are advanced against the biasing actions of the return springs 176, 178.

A control piston 182 is fixed to the rear end of the second pressure piston 168. The control piston 182 having a circular transverse cross section has a larger diameter than the second pressure piston 168 and is fluid-tightly and axially slidably received in a large-diameter hole 184 which has a larger diameter than the cylinder bore 165. The large-diameter hole 184 also accommodates an annular retainer 186 fixed at its front end. The annular retainer 186 fluid-tightly and axially slidably supports the second pressure piston 168. The second pressure piston 168, control piston 182, annular retainer 186 and the housing 164 cooperate to define an annular control chamber 188 filled with the brake fluid. Like the control chamber 90 in the first embodiment, this control chamber 188 is connected to a reservoir 194 through a port 190 and a fluid passage 192. The passage 192 is provided with a solenoid-operated shut-off valve 196 which is operated between an open and a closed position for permitting and inhibiting the fluid flows between the reservoir 194 and the control chamber 188, for permitting and inhibiting the advancing movement of the control piston 182. However, the control piston 182 can be retracted even when the shut-off valve 196 is closed, since the brake fluid flows from the reservoir 194 into the control chamber 188 through a check valve 202 provided in a by-pass passage 198 which by-passes the shut-off valve 196.

The vacuum booster 162 has a casing 208 fixed to a fixing portion 210 formed at the end of the housing 164 of the master cylinder 160. The vacuum booster 162 is similar in construction to the vacuum booster 12 in the preceding embodiment. The same reference numerals as used in FIG. 1 are used in FIG. 2 to identify the corresponding components. No redundant description of these components of the booster 162 will be provided. The output rod 70 of the vacuum booster 162 which is fixed to the power piston 64 is held in abutting contact with the control piston 182. When the shut-off valve 196 is placed in the open position permitting the control piston 182 to be advanced, an advancing movement of the output rod 70 upon operation of the brake pedal 10 will cause advancing movements of the control piston 182 and the first and second pressure pistons 166, 168, whereby the fluid pressures are generated in the respective first and second pressure chambers 170, 172. When the shut-off valve 196 is placed in the closed position inhibiting the advancing movement of the control piston 182, the operation of the brake pedal 10 will not cause an advancing movement of the output rod 70, whereby the fluid pressures in the chambers 170, 172 will not increase by operating the brake pedal 10. If the brake pedal 10 is released toward the non-operated position with the shut-off valve 196 placed in the closed position, the brake fluid is fed from the reservoir 194 into the annular control chamber 188 through the check valve 202, whereby the output rod 70 is permitted to move backwards, resulting in decreasing the fluid pressures in the pressure chambers 170, 172. In the present second embodiment, the control piston 182 which moves together with the second pressure piston 168 serves as the movable member which cooperates with the shut-off valve 196 and the control chamber 188 to constitute the device for inhibiting the pressure pistons 166, 168 from being advanced by the brake pedal 10 during an anti-lock pressure regulating operation of the brake system.

The housing 164 of the master cylinder 160 has another large-diameter fixing portion 220 at its end remote from the fixing portion 210 to which the vacuum booster 162 is fixed. To the fixing portion 220, there is attached a cup-shaped casing 222 which accommodates a nut 224 such that the nut 224 (internally threaded member) is rotatable and axially immovable relative to the casing 222. The nut 224 has a large-diameter gear 226 fixed at one end thereof. The gear 226 meshes with a driven gear 232 (driven member) fixed to an output shaft 230 (driving member) of an electric drive motor 228, so that the gear 226 and the nut 224 are rotated by the drive motor 228. Reference numeral 234 denotes a clutch which permits a torque to be transmitted from the drive motor 228 to the driven gear 232, but inhibits the driven gear 232 from rotating the output shaft 230 of the motor 228.

The nut 224 engages a ballscrew 240 (externally threaded member), which has a pressure changing piston 242 at its end adjacent to the master cylinder 160. The pressure changing piston 242 is fluid-tightly and axially slidably received in the cylinder bore 165, and cooperates with the housing 164 and the first pressure piston 166 to define the first pressure chamber 170. The end portion of the ballscrew 240 remote from the master cylinder 160 extends out of the threaded bore of the nut 224, and has a circular disc-like stop 246 having a larger diameter than the diameter of the threaded portion of the ballscrew. The disc-like stop 246 is adapted to abut on the bottom wall of the cup-shaped casing 222, to thereby limit the advancing movement of the ballscrew 240 in the direction away from the first pressure piston 166. The extreme end of the ballscrew 240 in front of the stop 246 has a splined outer circumferential surface 248 which engages a splined hole 250 formed in the bottom wall of the casing 222. Thus, the ballscrew 240 is prevented from rotating relative to the casing 222. In this arrangement, a rotary motion of the nut 224 will cause the ballscrew 240 to axially move with the pressure changing piston 242, thereby changing the volumes of the first and second pressure chambers 170, 172 and the pressures in these chambers. In the present embodiment, the nut 224, large-diameter gear 226, drive motor 228, driven gear 232, ballscrew 240 and piston 242 constitute a major portion of the pressure changing device for changing the pressures in the pressure chambers 170, 172 during an anti-lock pressure regulating operation under the control of the anti-lock control unit 140, which controls the drive motor 228, as in the preceding embodiment.

In the hydraulically operated anti-lock brake system constructed as described above by reference to FIG. 2, the solenoid-operated shut-off valve 196 is normally placed in the open position permitting the control piston 182 to be advanced by the operated brake pedal 10, while the ballscrew 240 is normally held in its fully retracted position in which the pressure changing piston 242 is in abutting contact with the inward flange portion 174 of the housing 164. Upon operation of the brake pedal 10, the control piston 182 and the first and second pressure pistons 166, 168 are advanced to thereby develop the fluid pressures in the pressure chambers 170, 172, for applying brake to the wheel cylinders. In this condition, an axial thrust force applied from the piston 242 to the ballscrew 240 is converted into a torque acting on the nut 224. However, the nut 224 is not rotated, since the rotation of the output shaft 230 of the drive motor 228 is prevented by the clutch 234, and the ballscrew 240 is not axially moved. Thus, the fluid pressures corresponding to the operating force acting on the brake pedal 10 are generated in the pressure chambers 170, 172.

When the brake pedal 10 is depressed with an excessively large operating force, the slip ratio of any wheel exceeds an upper limit of the predetermined optimum range. In this event, the anti-lock control unit 140 switches the solenoid-operated shut-off valve 196 to the closed position inhibiting the advancing movement of the control piston 182, and operates the drive motor 228 for controlling the volumes of the pressure chambers 170, 172, so as to control the braking pressures applied to the four wheels 38, 40, 52, 54 in an anti-lock manner. Described more particularly, the drive motor 228 is first operated in the clockwise direction as seen in the advancing direction of the control piston 182 (as seen facing the rear end of the motor 228 or as seen from right to left in FIG. 2). As a result, the nut 224 is rotated in the counterclockwise direction as seen in the same direction, whereby the pressure changing piston 242 is advanced so as to increase the volume of the first pressure chamber 170, to lower the fluid pressure in this chamber. This advancing movement of the piston 242 is effected while the shut-off valve 196 is placed in the closed position, inhibiting the fluid flow from the control chamber 188 and inhibiting the advancing movements of the control piston 182 and second pressure piston 168. In this condition, the first pressure piston 166 is axially moved toward the pressure changing piston 242 until the sum of the thrust based on the pressure in the first pressure chamber 170 and the biasing force of the return spring 176 becomes equal to the sum of the thrust based on the pressure in the first pressure chamber 172 and the biasing force of the return spring 178. Eventually, the volumes of the first and second pressure chambers 170, 172 are increased by the advancing movement of the pressure changing piston 242, whereby the pressures in the chambers 170, 172 and the pressures in the wheel cylinders are accordingly lowered.

When the slip ratio of the relevant wheel has been reduced to fall within the optimum range as a result of the reduction in the fluid pressures in the pressure chambers 170, 172, the drive motor 228 is turned off or operated in the reverse direction to stop or retract the ballscrew 240, for maintaining or increasing the fluid pressures in the pressure chambers 170, 172 and in the wheel cylinders. Thus, the pressures in the wheel cylinders can be lowered, held or increased in an anti-lock manner, by moving the ballscrew 240 to change the volumes of the pressure chambers 170, 172 by operating the drive motor 228, independently of the operating amount of the brake pedal 10, so that the brake is applied to the wheels with the slip ratios of the wheels are held within the optimum range.

In the present second embodiment, the movable member in the form of the control piston 182 is moved together with the second pressure piston 168, and the pressure changing device including the screw device consisting of the nut 224 and ballscrew 240 is positioned on one side of the master cylinder 160 remote from the vacuum booster 162. Accordingly, the operating force applied to the brake pedal 10 is transmitted from the output rod 70 to the second pressure piston 168 via only the control piston 182, without via the pressure changing device, so that the distance between the front end of the output rod 70 and the second pressure piston 168 is comparatively short. In this respect, the control piston 182 may be considered as an integral part of the piston 168, or the pistons 168 and 182 may be considered as a single unitary component. This arrangement makes it possible to simplify the construction of the vacuum booster 162. Further, unlike the first embodiment, the present embodiment does not require means for permitting the nut 224 and ballscrew 240 to be axially moved while preventing rotations of these members 224, 240 when brake is normally applied to the wheels by operation of the brake pedal 10. Accordingly, the present embodiment does not require sealing members associated with the pressure changing device, either. Thus, the pressure generating apparatus of the brake system can be simplified in construction, as compared with that of the first embodiment.

If the clutch 234 fails to operate and the nut 224 is permitted to freely rotate, an operation of the brake pedal 10 will cause the nut 224 to be rotated due to an axial thrust force applied to the ballscrew 240 during normal brake application, whereby the pressure changing piston 242 is advanced, and the volumes of the pressure chambers 170, 172 are increased. In this event, the operation of the brake pedal 10 will not result in generating the fluid pressures corresponding to the operating amount or force of the brake pedal 10. However, the advancing movement of the ballscrew 240 is limited by abutting contact of the disc-like stop 246 on the bottom wall of the casing 222. Thereafter, a further depression of the brake pedal 10 will permit the fluid pressures to increase in the pressure chambers 170, 172, and the braking force can be increased as the brake pedal 10 is further operated.

Figure 3:
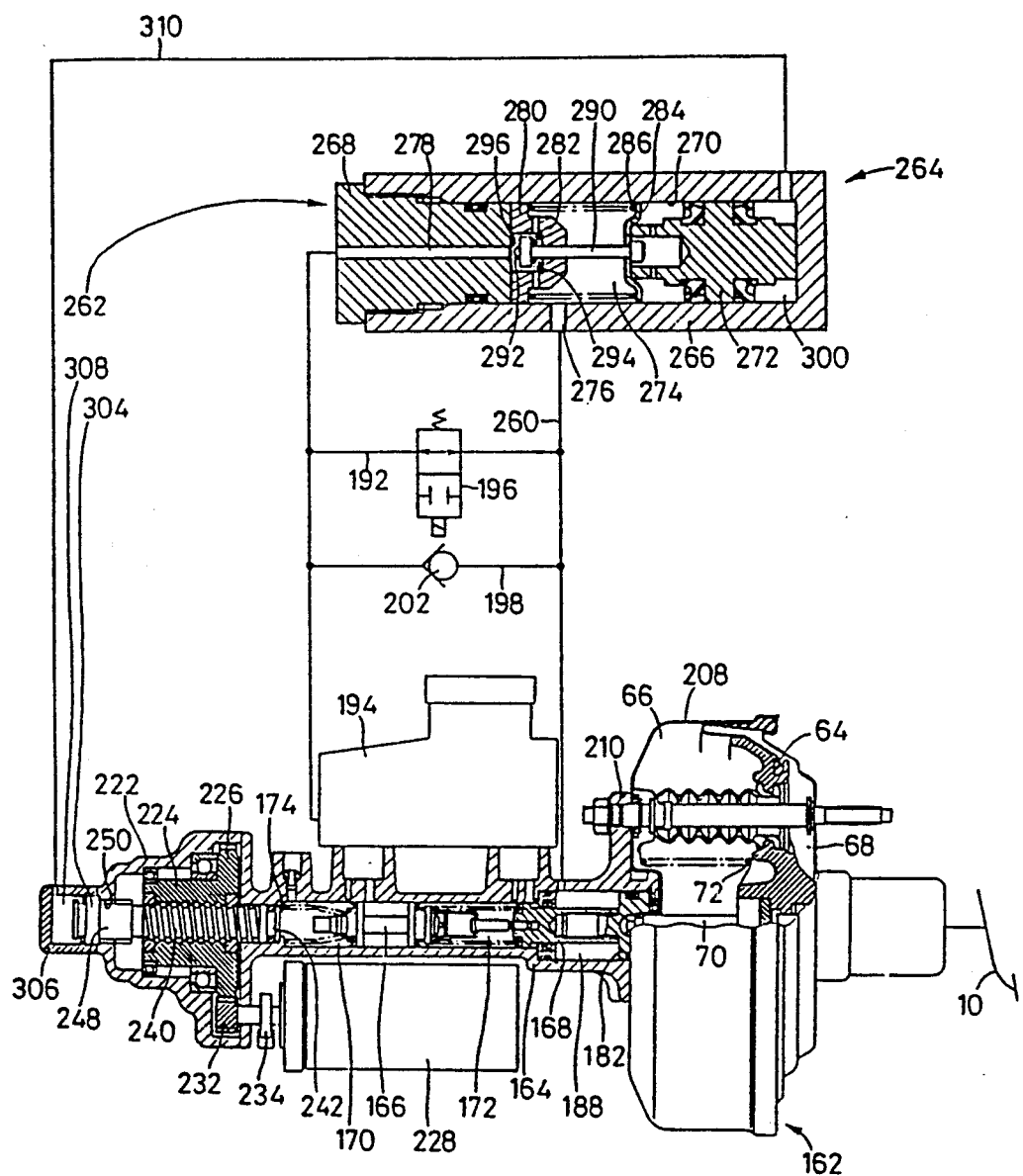
FIG. 3 is a front elevational view in cross section of a further embodiment of the invention.

Reference is now made to FIG. 3, which shows the third embodiment of the present invention, which is a modification of the second embodiment of FIG. 2. The third embodiment is substantially identical to the second embodiment, in terms of the vacuum booster, master cylinder and pressure changing device. The same reference numerals as used in FIG. 2 are used in FIG. 3 to identify the corresponding components, which will not be redundantly described. The third embodiment is characterized by the provision of a fail-safe device for assuring a normal braking operation by the brake pedal 10, even in the event that the shut-off valve 196 is abnormally placed in the closed position, due to some trouble with the anti-lock control unit 140 or the shut-off valve 196 itself.

In the third embodiment, a fluid passage 260 is provided in parallel with the fluid passage 192 in which the shut-off valve 196 is provided. This fluid passage 260 also connects the annular control chamber 188 and the reservoir 194. In the fluid passage 260, there is disposed a pilot-operated switch valve indicated generally at 262. The switch valve 262 has a housing 264 consisting of a cylindrical casing 266 having a bore 270 closed at one end, and a plug 268 which closes the other end of the cylinder bore 270. A piston 272 is fluid-tightly and axially slidably received in the cylinder bore 270. The piston 272 partially defines a fluid chamber 274 on one of its opposite sides. The fluid chamber 274 is held in communication with the control chamber 188 through a port 276 formed through the cylindrical wall of the cylindrical casing 266. The plug 268 has a port 278 formed therethrough, for fluid communication of the fluid chamber 274 with the reservoir 194. In the fluid chamber 274, there is slidably received a cup-shaped retainer 280 having a bottom wall 282 which faces the piston 272. A spring 286 is disposed between a spring seat 284 and the retainer 280, so that the retainer 280 is biased against the plug 268 under the biasing action of the spring 286. The retainer 280 cooperates with the casing 266 and the piston 272 to define the fluid chamber 274. A rod 290 extends through the bottom wall 282 of the retainer 280 such that the rod 290 is slidable in the longitudinal direction. The rod 290 is supported at its one end by the spring seat 284 such that the end portion of the rod 290 extends through the spring seat 284 and is longitudinally movable relative to the spring seat 284. The above-indicated end portion of the rod 290 has a flanged end that prevents the rod 290 from disengaging from the spring seat 284. The other end of the rod 290 has a valving member 292 which is opposed to a valve seat 296 formed at the inner end of the port 278 of the plug 268. The valving member 292 is biased toward the valve seat 296 by a spring 294.

The cylindrical casing 266 and the piston 272 in the cylinder bore 270 cooperate to define another fluid chamber 300 which is adapted to receive a pilot pressure during an anti-lock pressure regulating operation by the pressure changing device as described above.

The splined end 248 of the ballscrew 240 is formed with a piston 304 which is fluid-tightly and axially slidably received in a cup-shaped casing 306 attached to the casing 222. The casing 306 and the piston 304 cooperate to define a fluid chamber 308 which communicates with the fluid chamber 300 of the switch valve 262 through a fluid passage 310. Namely, the pilot pressure applied to the chamber 300 is produced in the fluid chamber 308.

When brake is normally applied in the present pressure generating apparatus, the ballscrew 240 is located with the piston 242 held in abutting contact with the inward flange portion 174 of the housing 164, and no pilot pressure is developed in the chamber 308. In this condition, the piston 272 of the switch valve 262 of the fail-safe device is placed in its fully retracted position, in abutting contact with the bottom wall of the cylindrical casing 266. In the fully retracted position, the valving member 292 of the rod 290 is spaced apart from the valve seat 296, whereby the fluid chamber 188 communicates with the reservoir 194 through the switch valve 262. Further, the shut-off valve 196 is placed in the open position during the normal brake application, whereby the first and second pressure pistons 166, 168 are advanced to generate the fluid pressures in the respective pressure chambers 170, 172 when the brake pedal 10 is depressed to apply brake to the wheels.

When the anti-lock control unit 140 finds that the wheel cylinder pressures must be regulated in the anti-lock manner, the solenoid-operated shut-off valve 196 is closed, and the drive motor 228 is activated to advance the ballscrew 240 for increasing the volumes of the pressure chambers 170, 172. As a result, the piston 304 in the fluid chamber 308 is advanced toward the bottom wall of the casing 306, whereby the pilot pressure is applied from the chamber 308 to the fluid chamber 300 of the pilot-operated switch valve 262. Consequently, the piston 272 of the switch valve 262 is advanced against the biasing action of the spring 286, while the rod 290 is advanced under the biasing action of the spring 294, whereby the valving member 292 is seated on the valve seat 296, to block the fluid communication between the control chamber 188 and the reservoir 194. Thus, the switch valve 262 as well as the shut-off valve 196 and the check valve 202 prevents the brake fluid from being fed from the control chamber 188 to the reservoir 194, thereby preventing the control piston 182 (second pressure piston 168) from being advanced by the operated brake pedal 10. In this condition, the pressure changing device including the drive motor 228 and the nut and ballscrew 224, 240 is operated to change the volumes of the pressure chambers 170, 172 for thereby controlling the wheel cylinder pressures so as to maintain the slip ratios of the wheels within the optimum range, as described above with respect to the second embodiment. This anti-lock pressure regulating operation is initiated when the wheel cylinder pressures become considerably high. Usually, the wheel cylinder pressures are first lowered to a considerable extent, and then increased, maintained and lowered at a level lower than the level at which the anti-lock operation is initiated. Therefore, when the wheel cylinder pressures are first lowered, the pilot pressure is applied from the fluid chamber 308 to the fluid chamber 300 of the switch valve 262, so that the switch valve 262 disconnects the control chamber 188 and the reservoir 194. Even when the ballscrew 240 and the piston 304 are retracted toward the pressure chambers 170, 172 to increase the wheel cylinder pressures, an amount of reduction in the pilot pressure in the chamber 308 due to an increase in the volume of the chamber 308 is not large enough to move the piston 272 of the switch valve 262 into abutting contact with the bottom wall of the casing 266. Namely, the valving member 292 remains seated on the valve seat 296 under the biasing action of the spring 294, whereby the control chamber 188 and the reservoir 194 remain disconnected from each other by the switch valve 262, until the anti-lock pressure regulating operation is terminated by the anti-lock control unit 140. Upon termination of the anti-lock operation, the ballscrew 240 is moved to its fully retracted position, whereby the volume of the fluid chamber 308 is increased to the initial value before the anti-lock operation, and the pilot pressure applied to the chamber 300 is lowered enough to move the piston 272 into abutment on the bottom wall of the casing 266, causing the valving member 292 to be unseated from the valve seat 296. Thus, the switch valve 262 is opened permitting the fluid communication between the chamber 188 and the reservoir 194, for allowing the normal brake application by the brake pedal 10.

As described above, the pilot-operated switch valve 262 is closed to disconnect the control chamber 188 and the reservoir 194 only while an anti-lock pressure regulating operation is effected by the pressure changing device under the control of the control unit 140. When brake is normally applied by the brake pedal 10, therefore, the chamber 188 and the reservoir 194 communicate with each other through the fluid passage 260 and the switch valve 262 placed in the open position, even though the fluid passage 192 is disconnected by the shut-off valve 196 which is abnormally placed in the closed position, due to a trouble with any component of the shut-off valve 196, or due to a failure of the anti-lock control unit 140 to produce a signal to open the shut-off valve 196. Consequently, an operation of the brake pedal 10 will cause the control piston 182 to be advanced to advance the first and second pressure pistons 166, 168, for generating the fluid pressures in the pressure chambers 170, 172 to normally apply brake to the wheels. In the present third embodiment, the pilot-operated switch valve 262, piston 304 and fluid chamber 308 constitute a major portion of the fail-safe device for selectively connecting and disconnecting the control chamber 188 to or from the reservoir 194, in order to allow or inhibit the advancing movement of the control piston 182 (second pressure piston 168).

It will be understood from the above explanation that the fail-safe device 262, 304, 308 provided in the third embodiment is adapted to mechanically detect the commencement of an anti-lock pressure regulating operation, and provide the pilot pressure in the chamber 308 in response to the commencement of the anti-lock operation, for automatically and mechanically blocking the fluid communication between the control chamber 188 and the reservoir 194. When the anti-lock pressure regulating operation is not effected, the fail-safe device 262, 304, 308 permits the fluid communication between the chamber 188 and the reservoir 194. This mechanical or pilot-operated fail-safe device is more advantageous in safety of operation than an electrically operated fail-safe device which electrically detects the commencement of the anti-lock pressure regulating operation, and electrically permits or inhibits the communication between the chamber 188 and the reservoir 194. However, the electrically operated fail-safe device may be employed for the anti-lock brake systems illustrated in FIGS. 1-3.

In the present embodiment wherein the switch valve 262 is normally open, brake can be applied by the brake pedal 10, even when the shut-off valve 196 is operated to the closed position for checking the shut-off valve for normal functioning.

Further, the fully advanced position of the ballscrew 240 is determined by the abutting contact of the piston 304 with the bottom wall of the cup-shaped casing 306. That is, the piston 304 functions as a stop, and eliminates an exclusive stop as provided in the embodiment of FIG. 2, between the spline 248 and the threaded portion of the ballscrew 240, whereby the construction of the ballscrew 240 is comparatively simplified.

While the illustrated embodiments are adapted to inhibit only the advancing movement of the control piston 80, 182, and allow the retracting movement of the same during the anti-lock pressure regulating operation, it is possible to inhibit also the retracting movement. In this case, for example, a fluid chamber similar to the chamber 90, 188 may be provided on the side of the outward flange 84 or control piston 182 which is remote from the chamber 90, 188. In this modified arrangement, the ballscrew 130, 240 can be moved to a position for generating the fluid pressures higher than those at the time of commencement of an anti-lock pressure regulating operation, while the brake pedal 10 is held stationary. Consequently, the fluid pressures can be controlled over a comparatively wide range. However, it is desirable to provide a sensor for detecting the operating force acting on the brake pedal 10, so that the control piston 80, 182 is permitted to be retracted to reduce the fluid pressures when the brake pedal 10 is released toward the non-operated position.

In the illustrated embodiments, the coil of the solenoid-operated shut-off valve 96, 196 is normally in the de-energized state for permitting the fluid communication between the control chamber 90, 188 and reservoir 32, 194, and is energized for inhibiting the fluid communication when an anti-lock pressure regulating operation is commenced. However, it is possible that the shut-off valve is normally placed in the open position by energization of the coil, and is switched to the closed position by de-energization of the coil upon commencement of the anti-lock pressure regulating operation. In this case, the shut-off valve 96, 196 is abnormally placed in the closed position, in the event the shut-off valve whose coil has been energized cannot be opened due to a trouble with some component of the shut-off valve, or in the event that the anti-lock control unit 140 fails to produce a signal for energizing the coil of the shut-off valve.

Figure 4:
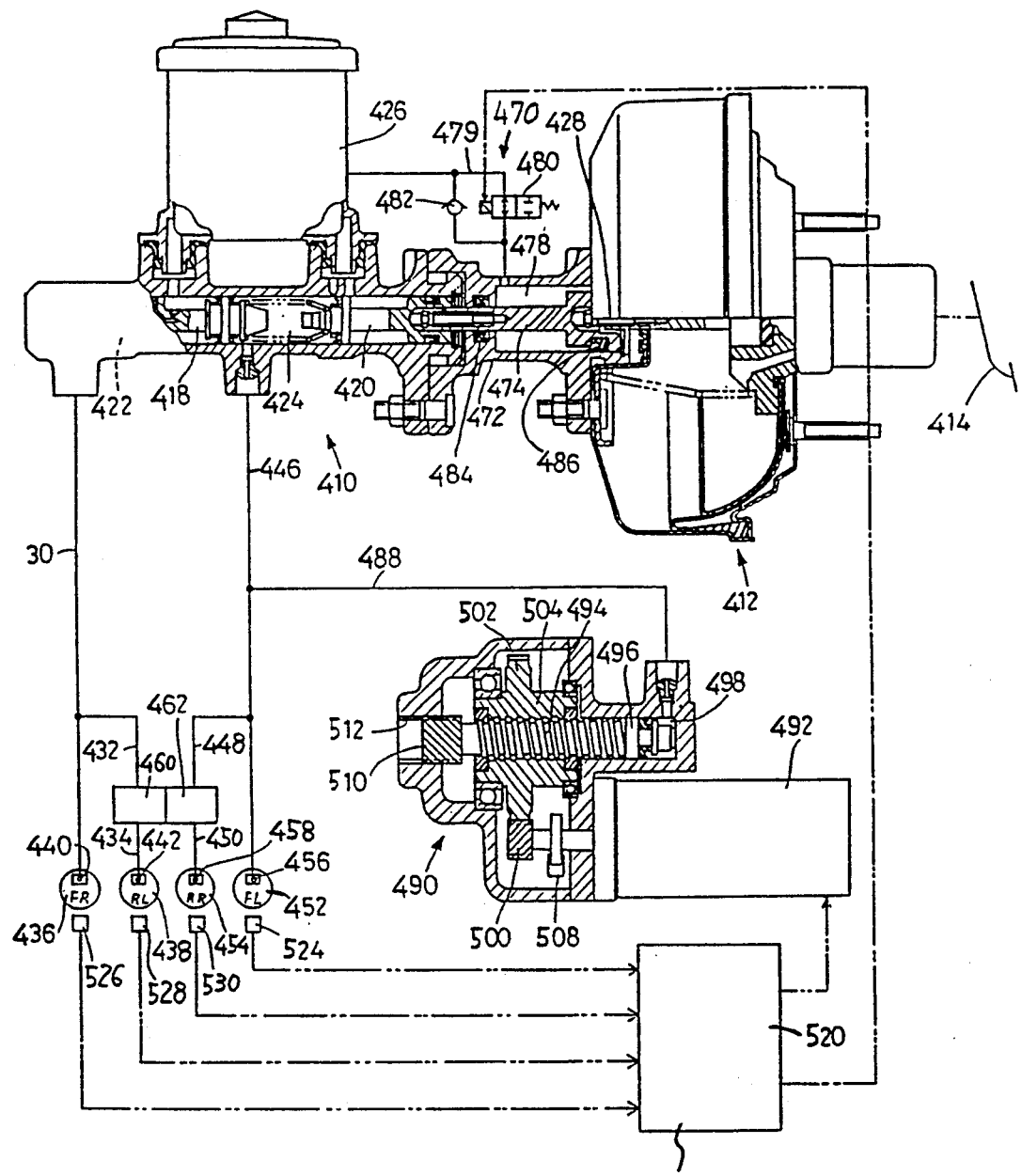
FIG. 4 is a partially diagrammatic front elevational view in cross section, showing an anti-lock hydraulic brake system incorporating a still further embodiment of the pressure generating apparatus of this invention.

Referring further to FIG. 4, there will be described a fourth embodiment of this invention, in which a pressure changing device 490 is not disposed coaxially with a master cylinder 410 and a vacuum booster 412.

The master cylinder 410 is linked with a brake pedal 414 (serving as a brake operating member) via the vacuum booster 412. The master cylinder 410 is a tandem type having two pressure pistons 418, 420 disposed in tandem. The two pressure pistons 418, 420 partially define respective two mutually independent pressure chambers 422, 424 and are operated in response to an operation of the brake pedal 414, to produce pressures of a brake fluid having substantially the same level corresponding to the operating amount of the brake pedal 414. Reference numeral 426 denotes a reservoir storing the brake fluid under the atmospheric pressure. The vacuum booster 412 boosts a received input force from the brake pedal 414, and transmits the boosted force to the pressure piston 420 through a push rod 428. The fluid pressure produced in the pressure chamber 422 is applied to wheel cylinders 440, 442 for a front right wheel 436 and a rear left wheel 438, through primary fluid passages 430, 432, 434 while the fluid pressure produced in the other pressure chamber 424 is applied to wheel cylinders 456, 458 for a front left wheel 452 and a rear right wheel 454, through primary fluid passages 446, 448, 450. Between the fluid passages 432 and 434, and between the fluid passages 448 and 450, there are disposed respective proportioning valves 460, 462. Thus, the present anti-lock brake system uses a diagonal or "X" piping arrangement wherein the front rear and rear left wheel cylinders 440, 442 communicate with each other while the front left and rear right wheel cylinders 456 and 458 communicate with each other.

Between the vacuum booster 412 and the master cylinder 410, there is provided inhibiting means 470 for inhibiting an advancing movement of a control piston 474. More specifically, the control piston 474 is fluid-tightly and axially slidably received within a cylindrical housing 472 which is closed and open at its opposite ends, respectively. The rear end (right-hand side end as seen in FIG. 4) of the control piston 474 engages the push rod 428 of the booster 412 while the front end (left-hand side end as seen in FIG. 4) engages the pressure piston 420. The housing 472 cooperates with the control piston 474 to define an annular control chamber 478 in front of a flange formed at the rear end of the control piston 474. The volume of the control chamber 478 is reduced and increased as the control piston 474 is advanced and retracted, respectively.

The control chamber 478 is connected to the reservoir 426 through a fluid passage 479 in which a solenoid-operated shut-off valve 480 is provided. A check valve 482 is provided in parallel to the shut-off valve 480, so that the check valve 482 permits a flow of the brake fluid from the reservoir 426 to the control chamber 478 but inhibits a flow of the fluid in the reverse direction. To secure fluid tightness between the housing 472 and the control piston 474, there are disposed two cup seals 484, 486 at the opposite ends of the control piston 474. Each cup seal 484, 486 has a first lip and a second lip which extend inwardly and outwardly of the control chamber 478, for preventing flows of the fluid into and out of the chamber 478 in the opposite axial directions of the control piston 474.

With the inhibiting means 470 constructed as described above, the advancing movement of the control piston 474 is inhibited with the brake fluid trapped within the control chamber 478, when the solenoid-operated shut-off valve 480 is in the closed position. That is, with the shut-off valve 480 placed in the closed position, an operation of the brake pedal 414 will not cause the control piston 474 to be advanced to increase the fluid pressures in the master cylinder 410. When the operated brake pedal 414 is moved toward the fully released or non-operated position while the shut-off valve 480 is closed, the control piston 474 is permitted to be retracted with the brake fluid flowing from the reservoir 426 to the control chamber 478.

The pressure chamber 424 of the master cylinder 410 communicates with the pressure changing device 490 through a fluid passage 488 connected to the primary fluid passage 446. The pressure changing device 490 includes an electric drive motor 492, a ballscrew 494 (externally threaded member) which is advanced and retracted based on bidirectional operations of the drive motor 492, and a pressure changing piston 496 which partially defines a pressure changing chamber 498. The pressure changing piston 496 is moved with the ballscrew 494 to change the fluid pressure in the pressure changing chamber 498. The drive motor 492 is operatively connected to the ballscrew 494 through a small-diameter gear (driven member) 500, a large-diameter gear 502 meshing with the small-diameter gear 500, and a nut (internally threaded member) 504 formed integrally with the gear 502. Thus, a rotary movement of the output shaft (driving member) of the drive motor 492 is converted into a linear movement of the ballscrew 494 for advancing and retracting the pressure changing piston 496. The drive motor 492 and the small-diameter gear 500 are connected through a clutch 508, so that the rotary movement of the motor 492 is transmitted to the small-diameter gear 500, while the rotary movement of the gear 500 is inhibited while the motor 492 is not operated.

Reference numeral 510 designates a spline shaft formed as an integral part of the ballscrew 494, and reference numeral 512 designates a splined hole formed through the bottom wall of the housing of the pressure changing device 490, which is not structurally connected to the housing of the master cylinder 410 or vacuum booster 412. The spline shaft 510 engages the splined hole 512, so that the ballscrew 494 is axially movable within the housing but is not rotatable relative to the housing. The nut 504 engaging the ballscrew 494 is rotatably supported by the housing so as to be axially immovable relative to the housing.

The solenoid-operated shut-off valve 480 and the drive motor 492 are controlled by an anti-lock control unit 520 principally constituted by a computer incorporating a central processing unit, a read-only memory, a random-access memory, and a bus interconnecting these components. The control unit 520 receives output signals of speed sensors 524, 526 for detecting the speeds of the front wheels 452, 436, and speed sensors 528, 530 for detecting the speeds of the rear wheels 438, 454. Based on the output signals of these speed sensors, the control unit 520 calculates the speeds of the wheels, the running speed of the vehicle and the slip ratios of the wheels.

In the vehicle anti-lock brake system constructed as described above according to the present embodiment, the solenoid-operated shut-off valve 480 is normally placed in the open position, permitting the fluid communication between the control chamber 478 and the reservoir 426. In this condition, an operation of the brake pedal 414 will cause the control piston 474 to be advanced to advance the pressure pistons 418, 420 for generating the fluid pressures in the pressure chambers 422, 424, whereby brake is applied to the wheels. Since the retracting movement of the pressure changing piston 496 is inhibited by the clutch 508, the fluid pressure in the pressure changing chamber 498 is substantially the same as the pressure levels in the pressure chambers 422, 424.

When the slip ratio of any wheel exceeds an upper limit of the optimum range due to an excessively large operating force acting on the brake pedal 514, the control unit 520 closes the solenoid-operated shut-off valve 480 to inhibit the advancing movement of the control piston 474, and activates the drive motor 492 to move the pressure changing piston 496 so as to increase the volume of the pressure changing chamber 498. In consequence, the fluid pressure in the chamber 498, and the fluid pressures in the pressure chambers 422, 424 are lowered, whereby the wheel cylinder pressures are accordingly lowered to reduce the slip ratio of the relevant wheel. As a result, the reaction force applied from the pressure piston 420 to the control piston 474 is reduced, whereby there arises a difference between the thrust forces acting on the control piston 474 in the opposite directions, as long as the brake pedal 414 is maintained at the same operated position. Namely, the thrust force acting on the piston 474 in the advancing direction is larger, but the advancing movement of the piston 474 is inhibited since the fluid in the control chamber 478 is prevented from flowing toward the reservoir 426 by the shut-off valve 480 placed in the closed position. As a result, the fluid pressure in the control chamber 478 rises by an amount corresponding to an amount of reduction in the reaction force applied from the pressure piston 420 to the control piston 474. Thus, the shut-off valve 480 in the closed position inhibits the control piston 474 from being advanced to increase the pressures in the pressure chambers 422, 424, even after the pressures in the pressure chambers 422, 424 have been lowered by the pressure changing device 490.

When the slip ratio of the relevant wheel has been lowered to within the optimum range as a result of reduction in the wheel cylinder pressures, the control unit 520 turns off the drive motor 492 to stop the retracting movement of the pressure changing piston 496 for maintaining the current volume of the chamber 498 to hold the current wheel cylinder pressures, or switches the operating direction of the motor 492 to advance the piston 496 so as to reduce the volume of the chamber 498 for increasing the wheel cylinder pressures. When the wheel cylinder pressures are increased, the reaction force applied from the pressure piston 420 to the control piston 474 increases, and the pressure in the control chamber 478 accordingly increases, so as to balance the thrust forces which act on the control piston 474 in the opposite directions, whereby the control piston 474 is held at the same axial position. It will thus be understood that the control unit 520 controls the drive motor 492 for changing the volume of the pressure changing chamber 498 to thereby change the wheel cylinder pressures for maintaining the slip ratios of the wheels within the optimum range, independently of the operating force of the brake pedal 414. When the brake pedal 414 is released during the anti-lock pressure regulating operation as described above, the control piston 474 is retracted, and the pressure pistons 418, 420 are accordingly retracted to reduce the pressures in the pressure chambers 422, 424 to a level corresponding to the operating position of the brake pedal 414, i.e., to the level desired by the vehicle driver.

The present brake system is characterized in that the pressure changing device 490 is spaced apart from the axis of a unitary hydraulic unit consisting of the master cylinder 410, inhibiting means 470 and vacuum booster 412, which are disposed in series coaxially or concentrically with each other. That is, the pressure changing device 490 is structurally separated from the hydraulic unit 410, 412, 470, except that the pressure changing chamber 498 communicates with the pressure chamber 424 of the master cylinder 410 through the fluid passage 446, 488. The present brake system has a shorter axial dimension or length, than that of the brake systems of FIGS. 1-3 according to the preceding embodiments, in which the master cylinder, vacuum booster, pressure changing device and inhibiting means are all disposed in series in coaxial relation with each other. In the present embodiment of FIG. 4, the pressure changing device 490 can be located at any desired position within the engine room of the vehicle, irrespective of the position of the hydraulic unit 410, 412, 470, since the device 490 is connected to the master cylinder 410 merely by a hydraulic conduit. This arrangement provides a higher degree of freedom of design associated with the components accommodated within the engine room.

It is a general tendency in the field of automotive vehicles that some vehicle models are provided with a brake system equipped with an anti-lock control device, while some vehicle models are provided with a brake system not equipped with such anti-lock control device. If the housing configuration of the master cylinder for the brake system equipped with an anti-lock control device is different from that for the brake system not equipped with the anti-lock control device, it is necessary to prepare the master cylinder in two different configurations, which are used depending upon whether or not the brake system is equipped with the anti-lock control device. This pushes up the cost of manufacture of the vehicle. According to the present embodiment, however, the same master cylinder 410 can be used for the brake system not equipped with the anti-lock control device, as well as the brake system equipped with the anti-lock control device. In the former brake system, the master cylinder 410 is directly linked at its rear end (right-hand side end as seen in FIG. 4) with the front end of the vacuum booster 412, without the inhibiting means 470 disposed therebetween. Of course, the pressure changing device 490 and the anti-lock control unit 520 are eliminated. The anti-lock brake system according to the present embodiment can therefore be utilized for a brake system without the anti-lock control function, by using the same master cylinder, whereby the different types of brake systems are available at a comparatively low cost according to the present embodiment.

Figure 5:
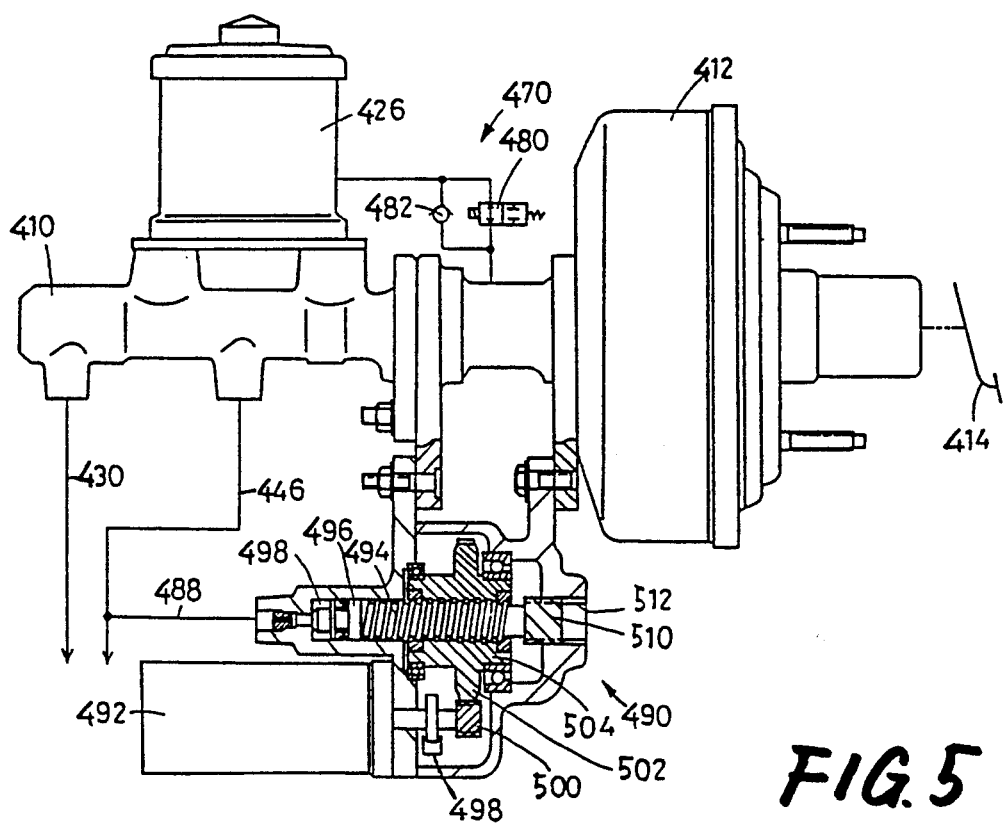
FIG. 5 is a front elevational view partially in cross section showing a part of a modified form of the pressure generating apparatus of FIG. 4 according to a yet further embodiment of the invention.

While the brake system illustrated in FIG. 4 is adapted such that the pressure changing device 490 is structurally separated from the master cylinder 410, inhibiting means 470 and booster 412, it is possible that the device 490, master cylinder 410, inhibiting means 470 and booster 412 are physically connected to each other as an integral hydraulic assembly wherein the pressure changing device 490 communicates with the master cylinder with a fluid passage. An example of this modification is illustrated in FIG. 5. In this modified embodiment, the pressure changing device 490 is attached to the inhibiting means 470 and is disposed in parallel to the hydraulic unit consisting of the master cylinder 410, inhibiting means 470 and booster 412, such that the axis of the pressure changing device 490 is spaced from the axis of the hydraulic unit 410, 470, 412 by a suitable distance.

The fourth and fifth embodiments of FIGS. 4 and 5 may also be modified such that the inhibiting means 470 inhibits both the advancing movement and the retracting movement of the control piston 474 during an anti-lock pressure regulating operation.

While the principle of the present invention has been described in its presently preferred embodiments all in the form of a pressure generating apparatus for a hydraulically operated anti-lock brake system for a motor vehicle, it is to be understood that the present invention is equally applicable to a pressure generating apparatus used for a traction control arrangement wherein brake is applied to a vehicle wheel upon slipping thereof due to an excessively large drive torque applied thereto at the time of starting or rapid acceleration of the vehicle. Further, the present invention is applicable to a pressure generating apparatus for a hydraulically operated brake system wherein the braking pressure applied to a wheel cylinder is controlled so as to provide a desired braking effect or vehicle deceleration effect which accurately corresponds to the operating force of the brake pedal actually detected by a sensor, irrespective of the gradient of the road surface or the load applied to the vehicle.

It is to be understood that the present invention may be embodied with various other changes, modifications and improvements, which may occur to those skilled in the art, without departing from the spirit and scope of the invention defined in the following claims.

What is claimed is:

1. A hydraulically operated anti-lock brake system for a motor vehicle having a wheel comprising:

a master cylinder having a pressure piston which partially defines a pressure chamber and which is advanced to generate a fluid pressure in said pressure chamber in response to an operation of an operating member;

a wheel cylinder operated by said fluid pressure to apply a brake to said wheel;

slip detecting means for generating an output signal indicative of the presence of an excessive amount of slipping of said wheel on a road surface;

an inhibiting device defining a non-operated state and an operated state, said inhibiting device allowing said pressure piston to be advanced in response to the operation of said operating member when in a non-operated state, and inhibiting said pressure piston from being advanced in response to the operation of said operating member when in an operated state;

a pressure changing device having a pressure changing chamber communicating with said pressure chamber, and operable to change a volume of said pressure changing chamber and thereby change the pressure in said pressure chamber; and a controller for normally placing said inhibiting device in said non-operated state when the output signal does not indicate the presence of an excessive amount of slipping of said wheel, and for placing said inhibiting device in said operated state and controlling said pressure changing device when the output signal of said slip detecting means indicates the presence of an excessive amount of slipping so as to change the pressure in said pressure chamber for maintaining an amount of slipping of said wheel within an optimum range, said controller holding said inhibiting device in said operated state to inhibit an advancing movement of said pressure piston in response to the operation of said operating member until completion of an operation for controlling the pressure in said pressure chamber so as to maintain said amount of slipping of said wheel within said optimum range, said pressure changing device comprising (a) a screw device including an externally threaded member and an internally threaded member which engage each other, one of said externally and internally threaded members being a rotatably immovable threaded member prevented from rotating about an axis thereof, (b) a drive device for rotating the other of said externally and internally threaded members, the other of said externally and internally threaded members being a rotatably movable threaded member, and (c) a pressure changing piston axially movable with one of said externally and internally threaded members, for changing the volume of said pressure changing chamber.

2. A hydraulically operated anti-lock brake system according to claim 1, wherein said inhibiting device comprises:

a movable member interposed between said operating member and said pressure piston, said movable member being advanced in response to the operation of said operating member; and inhibiting means for allowing advancing and retracting movements of said movable member thereby allowing advancing and retracting movements of said pressure piston in response to the operation of said operating member when said inhibiting device is in the non-operated state, and for inhibiting said movable member and said pressure piston from being advanced while allowing retracting movements of said movable member and said pressure piston in response to the operation of said operating member when said inhibiting device is in the operating state.

3. A hydraulically operated anti-lock brake system according to claim 1, further comprising a housing and a reservoir communicating with a fluid passage, and wherein said movable member comprises a control piston which is fluid-tightly and axially slidably disposed in said housing and which partially defines a control chamber filled with a fluid, said control chamber communicating with said fluid passage such that a volume of said control chamber is reduced by the advancing movement of said control piston, and wherein said inhibiting means comprises a shut-off valve provided in said fluid passage between said reservoir and said control chamber.

4. A hydraulically operated anti-lock brake system according to claim 3, wherein said inhibiting means further comprises a check valve disposed in parallel with said shut-off valve, said check valve permitting a flow of the fluid from said reservoir to said control chamber and inhibiting a flow of the fluid from said control chamber to said reservoir.

5. A hydraulically operated anti-lock brake system according to claim 3, wherein said control piston includes a large-diameter portion and a small-diameter portion disposed in front of said large-diameter portion, said housing and said large-diameter and small-diameter portions cooperating to define an annular chamber as said control chamber.

6. A hydraulically operated anti-lock brake system according to claim 3, further comprising a fail-safe device for inhibiting the advancing movement of said movable member under normal conditions when said inhibiting device is in said operated state and for allowing said advancing movement of said movable member under abnormal conditions when said inhibiting device is abnormally in said operated state.

7. A hydraulically operated anti-lock brake system according to claim 6, wherein said fail-safe device normally operates in an open state for allowing the advancing movement of said movable member and operates in a closed state for inhibiting the advancing movement of said movable member in response to an operation of said pressure changing device.

8. A hydraulically operated anti-lock brake system according to claim 7, wherein said fail-safe device comprises a pilot-operated switch valve disposed in parallel to said shut-off valve, said switch valve being closed due to a pilot pressure supplied from said pressure changing device when said pressure changing device is operated to change the fluid pressure in said pressure chamber.

9. A hydraulically operated anti-lock brake system according to claim 1, wherein the externally threaded member of said pressure changing device is a ballscrew and the internally threaded member of said pressure changing device is a nut.

10. A hydraulically operated anti-lock brake system according to claim 1, wherein said externally and internally threaded members are disposed between said movable member and said pressure piston such that said externally and internally threaded members are axially movable with respect to each other and in engagement with each other, said rotatably immovable threaded member being axially movable with said movable member, and said pressure piston and said pressure chamber serving as said pressure changing piston and said pressure changing chamber, respectively.

11. A hydraulically operated anti-lock brake system according to claim 10, wherein said drive device of said pressure changing device comprises a gear which has a splined bore and which is supported by a housing of the apparatus such that said gear is rotatable and axially immovable, said internally threaded member engaging said splined bore such that said gear and said internally threaded member are axially movable relative to each other and are rotatably immovable relative to each other, said externally threaded member and said movable member engaging each other such that said externally threaded member and said movable member are axially movable relative to each other and rotatably immovable relative to each other, said housing preventing said externally threaded member and said movable member from being rotated.

12. A hydraulically operated anti-lock brake system according to claim 1, wherein said pressure changing piston is opposed to said pressure piston, with said pressure chamber interposed between said pressure changing piston and said pressure piston, said pressure chamber also serving as said pressure changing chamber.

13. A hydraulically operated anti-lock brake system according to claim 1, wherein said pressure changing device and said master cylinder are structurally separated from each other, and wherein said pressure changing chamber of said pressure changing device and said pressure chamber of said master cylinder communicate with each other through a fluid passage.

14. A hydraulically operated anti-lock brake system according to claim 1, wherein said inhibiting device is disposed coaxially with said master cylinder, and wherein said pressure changing device is disposed such that an axis of said pressure changing device is spaced from an axis of said inhibiting device.

15. A hydraulically operated anti-lock brake system according to claim 1, wherein said drive device comprises:
a driving member rotated by a drive source;
a driven member rotated by said driving member to rotate the rotatably movable threaded member; and
a clutch device interposed between said driving and driven members, and operating to transmit a torque from said driving member to said driven member and prevent the transmission of a torque from said driven member to said driving member.

16. A hydraulically operated anti-lock brake system according to claim 15, further comprising a stop device for limiting a retracting movement of the rotatably movable threaded member which is rotated with said pressure changing piston, said retracting movement causing an increase in the volume of said pressure changing chamber.

17. A pressure generating apparatus for a hydraulically operated brake system, comprising:
a master cylinder having a pressure piston which partially defines a pressure chamber and which is advanced to generate a fluid pressure in said pressure chamber in response to an operation of an operating member;
an inhibiting device having a non-operated state for allowing said pressure piston to be advanced in response to the operation of said operating member and an operated state for inhibiting said pressure piston from being advanced in response to the operation of said operating member;
a pressure changing device having a pressure changing chamber communicating with said pressure chamber, and operable to change a volume of said pressure changing chamber and thereby change the pressure in said pressure chamber; and
a controller for controlling said inhibiting device and said pressure changing device to change the pressure in said pressure chamber while said inhibiting device is in said operated state,
said pressure changing device comprising (a) a screw device including an externally threaded member and an internally threaded member which engage each other, one of said externally and internally threaded members being a rotatably immovable threaded member prevented from rotating about an axis thereof, (b) a drive device for rotating the other of said externally and internally threaded members, the other of said externally and internally threaded members being a rotatably movable threaded member, and (c) a pressure changing piston axially movable with one of said externally and internally threaded members, for changing the volume of said pressure changing chamber,
said pressure changing device and said master cylinder being disposed coaxially relative to each other, and said pressure chamber of said master cylinder serving as said pressure changing chamber of said pressure changing device.

18. A pressure generating apparatus according to claim 17, wherein said externally and internally threaded members are disposed between said movable member and said pressure piston such that said externally and internally threaded members are axially movable with respect to each other and in engagement with each other, said rotatably immovable threaded member being axially movable with said movable member, and said pressure piston of said master cylinder serving as said pressure changing piston of said pressure changing device.

19. A pressure generating apparatus according to claim 17, wherein said pressure changing piston is opposed to said pressure piston, with said pressure chamber being interposed between said pressure changing piston and said pressure piston.

* * * * *